Figure 1:
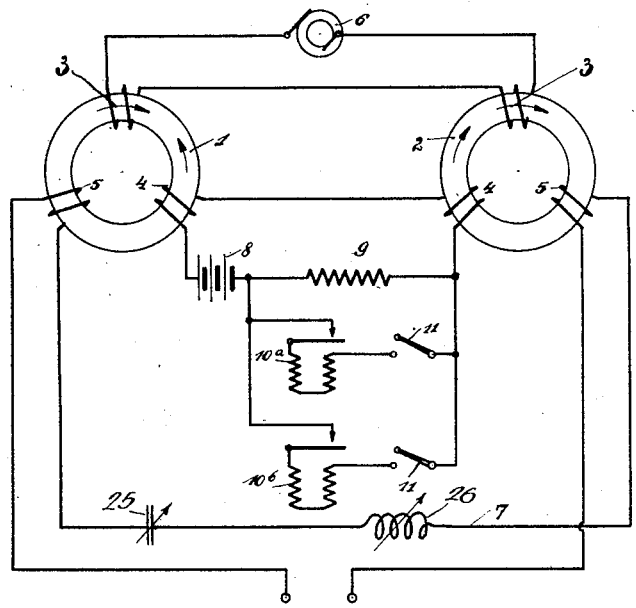

G. VON ARCO & A. MEISSNER.
MEANS FOR PRODUCING HIGH FREQUENCY CURRENTS.
APPLICATION FILED APR. 19, 1913.

1,181,556.

Patented May 2, 1916.
5 SHEETS—SHEET 2.

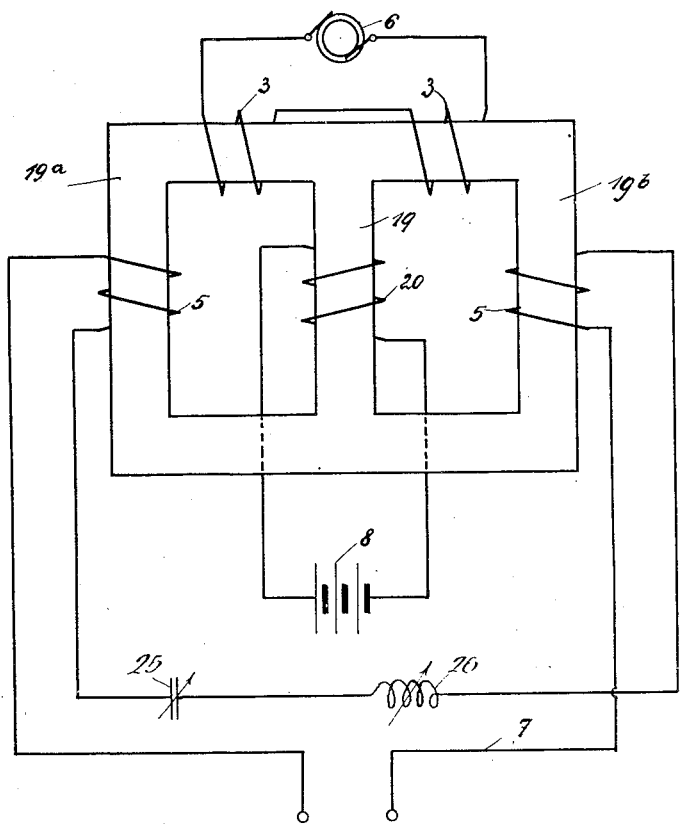

UNITED STATES PATENT OFFICE.

GEORG VON ARCO AND ALEXANDER MEISSNER, OF NEAR BERLIN, GERMANY, ASSIGNORS TO GESELLSCHAFT FUER DRAHTLOSE TELEGRAPHIE M. B. H., OF BERLIN, GERMANY.

MEANS FOR PRODUCING HIGH-FREQUENCY CURRENTS.

1,181,556.       Specification of Letters Patent.       Patented May 2, 1916.

Application filed April 19, 1913. Serial No. 762,359.

*To all whom it may concern:*

Be it known that we, GEORG VON ARCO, a subject of the German Emperor, and ALEXANDER MEISSNER, a citizen of the Empire of Austria-Hungary, and both residing near Berlin, Germany, have invented certain new and useful Improvements in Means for Producing High-Frequency Currents, of which the following is a full and clear specification, illustrated in the accompanying drawings, the novel features being more particularly pointed out in the annexed claims.

Our invention relates to means for increasing the frequency of an alternating current by means of stationary transformers and by the use of an auxiliary magnetizing current in such transformers, whereby when the primary winding is supplied with alternating current of a certain frequency currents of double the frequency are produced in the secondary winding of the transformer. Arrangements of this character are already known in the art. In making such transformers available for use in wireless telegraphy, we have found that by comparatively slightly varying the current intensity of the auxiliary magnetizing current the intensity of the secondary current may be varied within wide limits, when certain electrical conditions prevail. Furthermore we have found that the variation of the secondary current intensity compared with the variation of the auxiliary magnetizing current can be a maximum under certain electrical conditions in the transformer circuit. This may be explained perhaps as follows: If the secondary current is graphically plotted in dependence of the inductance in the secondary circuit, the result is a resonance curve. Now, since the inductance in the secondary circuit is also dependent upon the property of the iron cores, in particular dependent upon the magnetic condition of the latter, the inductance in the secondary circuit and thus the intensity of the secondary current varies with the amount of auxiliary magnetizing. By suitably selecting the electrical conditions such as the resistance, the inductance and the capacity within the secondary circuit, the result may easily be obtained that the above mentioned variation of the secondary current intensity takes place within the limits of resonance and thus very large variations of the secondary current may be produced by comparatively small variation of the auxiliary magnetizing. This phenomenon may be used to great advantage in wireless telegraphy. For instance by varying the auxiliary magnetizing circuit through a resistance, very sharp turning of the secondary circuit to the frequency imposed upon it may be brought about.

In the accompanying drawings we have illustrated how the auxiliary magnetizing may be suitably varied to serve the purposes of wireless telegraphy.

Figure 2:
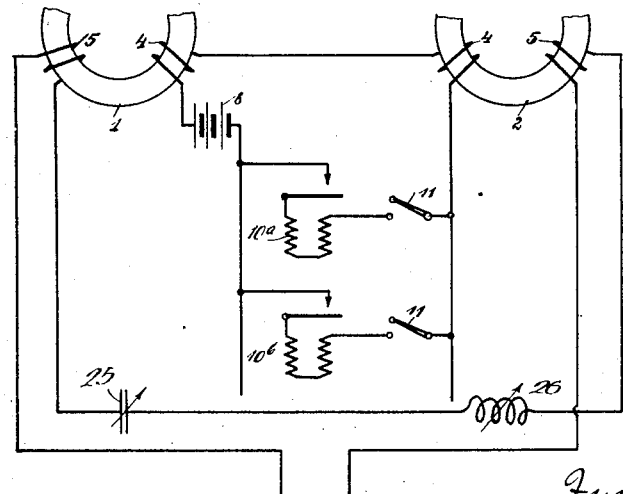
Figure 3:
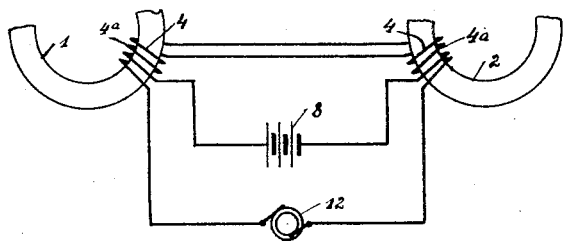
Figure 4:
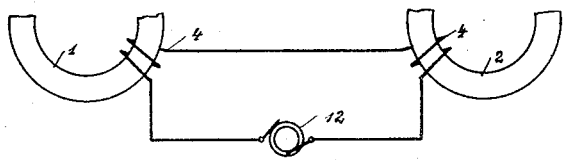
Figure 5:
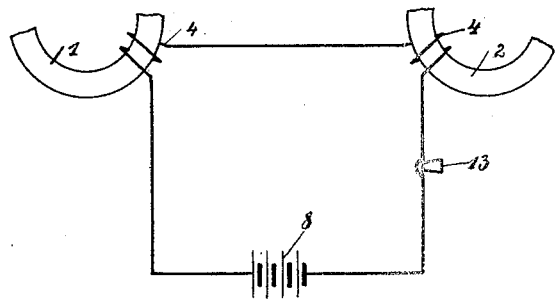
Figure 6:
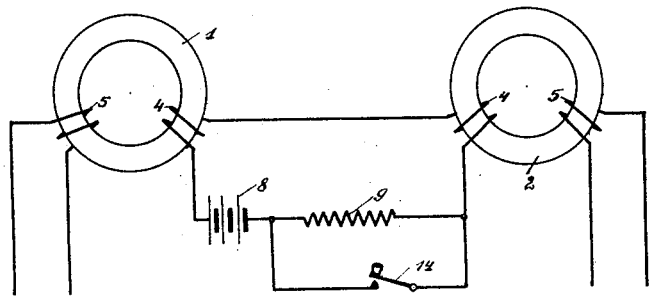
Figure 7:
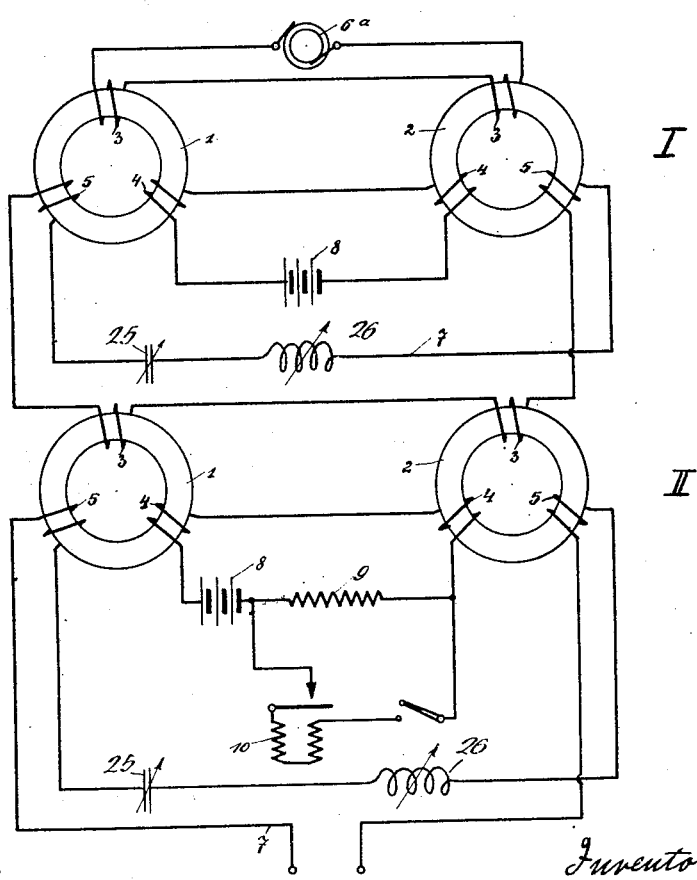
Figure 8:
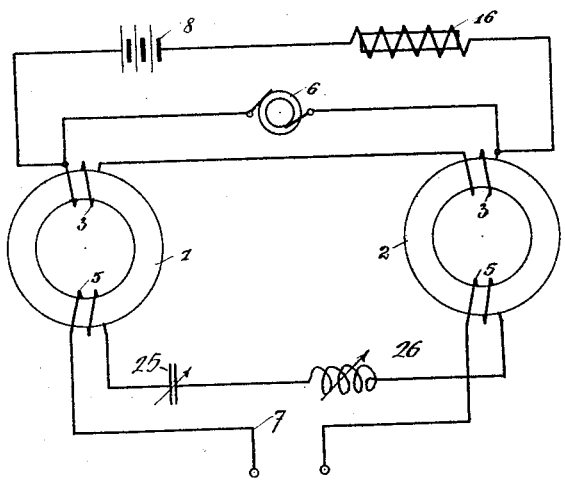
Figure 9:
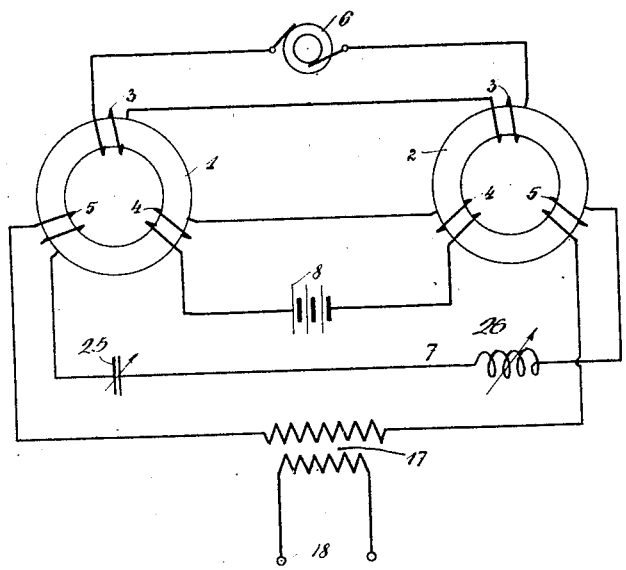

In these drawings: Figure 1 shows the general arrangement of a high frequency transformer with means for varying the auxiliary magnetizing current. Fig. 2 shows a modification of such variation. Fig. 3 shows how an alternating current of a frequency equal to the pitch of a musical tone may be superimposed upon the auxiliary magnetizing current. Fig. 4 shows how alternating current alone may be used as an auxiliary magnetizing current with a frequency equal to the pitch of a musical tone. Fig. 5 shows how a microphone current may be superimposed on the auxiliary magnetizing current. Fig. 6 shows how a simple Morse key may be used for producing variations in the auxiliary current. Fig. 7 shows several sets of transformers in cascade arrangement. Fig. 8 shows the auxiliary direct current supplied to the primary winding of the transformer. Fig. 9 shows a high frequency transformer in circuit with the secondary transformer winding to control the voltage of the high frequency current at the points of consumption. Fig. 10 shows a modification of the transformer in which the two separate cores shown in the previous figures are united into one transformer with two magnetic circuits.

In Fig. 1, 1 and 2 represent the cores of two closed transformers on each of which a primary winding 3 is disposed and wound in the same direction, both windings being connected in series and in circuit with a source of alternating current for instance the generator 6. Moreover on each core is disposed an auxiliary winding 4, one wound oppositely to the direction in which the other one is wound, which are connected in circuit with a source of direct current, for instance the battery 8, so that an auxiliary magnetizing current may be supplied to both transformer cores. Further, on each core is disposed a secondary transformer winding 5, both windings being wound in the same direction but oppositely to that in which primary windings 3 are wound. Now by properly energizing both cores by means of the auxiliary current to the point where the magnetic permeability of the iron rapidly decreases, the effect is brought about that the frequency in the secondary coils 5 is double the frequency supplied to coils 3. The cause of this is that the transformer core which at a certain moment is magnetized by the auxiliary current and by the primary alternating current which at that time is a maximum, only very slowly and very slightly permits an increase of lines of force whereas the other transformer core, which at the same time is magnetized by the same auxiliary current but the primary alternating current windings of which oppose those of the auxiliary winding, very quickly permits the decrease of lines of force. Thus in one core the decrease is very rapid and in the other core the increase of the field is delayed. This produces, owing to the manner in which the secondary and primary windings are connected, in the secondary windings a full period during one half period of the generator 6, which supplies the primary windings. By properly dimensioning the cores and the coils of these transformers and by properly controlling the auxiliary magnetizing current we may produce a great variation of the intensity of the secondary current for a small variation of the magnetizing current, provided, as stated before, the electrical conditions, such as the resistance, inductance and capacity of the secondary circuit are properly selected. For the purpose of tuning the secondary circuit 7 a variable capacity 25 and a variable inductance 26, is provided in that circuit. Then as stated in the introduction to the specification, the condition may be brought about that at a given degree of syntony between the secondary circuit and the higher frequency produced therein, the variation of the intensity of the auxiliary magnetizing current causes a closer tuning or also if desired a detuning, in case the secondary circuit is very sharply tuned to the higher frequency. This may be used to great advantage for producing so called tone frequencies in the secondary circuit which we propose to connect directly to the antennæ so that at the receiving station the signals may be perceived in a telephone as musical tones. This result may be obtained for instance by the means shown in Fig. 1 where a resistance 9 is arranged in series with the battery 8 which supplies the auxiliary coils 4, and in shunt to resistance 9 may be arranged in multiple any desired number of periodical interrupters 10ª, 10ᵇ each of which is adapted to interrupt the current at a frequency corresponding with the pitch of a different musical tone. By arranging switches 11, one for each interrupter, any of these interrupters may be thrown in shunt with resistance 9 and thus increase and decrease the intensity of the direct current by short circuiting periodically resistance 9. Thus intensity impulses produced thereby will be imparted to the secondary high frequency current from which the impulses are transmitted to the receiving station. The resistance 9 is preferably dimensioned so that when it is short circuited the current intensity of the secondary winding has a value corresponding with the peak of the resonance curve, whereas when the resistance is not short circuited by the interrupter the current intensity has a value corresponding with the lowest possible point of the resonance curve. Also it is preferable to design the interrupters so that the periods of closed circuit are longer than the periods of open circuit.

Instead of connecting the interrupters 10ª, 10ᵇ in shunt to a resistance they may be directly connected in circuit with the direct current source and thus directly open and close the magnetizing circuit. This modification is shown in Fig. 2 where it will be noted that the interrupters 10ª, 10ᵇ though in shunt relatively to each other are directly in series with the battery $a$ and coils 4. An effect is obtained by this arrangement similar to that of Fig. 1, though in Fig. 2 no permanent auxiliary magnetizing current flows, because when in that figure the circuit is closed by key 11 and the current flows through one of the interrupters or equivalent means 10ª, which produce a tone frequency, the following takes place: The magnetizing direct current being rhythmically interrupted has an auxiliary magnetizing effect upon the transformer, such as described, only during the period in which the interrupter closes the circuit. Now the direct current intensity being chosen such that it is sufficient to bring about the required saturation of the core, it is manifest that during such a closing period the frequency of the alternating current, supplied to the transformers is raised as described, whereas during the period in which the interrupter has opened the circuit, no such effect takes place. Thus the frequency is increased rhythmically according to the characteristic of the particular interrupting means 10ª used. It should be noted, however, that the period during which the auxiliary magnetizing current is effective is very long, compared with the periodicity of the high frequency oscillations produced in the transformer windings, so that a large number of high frequency oscillations take place during one low frequency period.

Instead of producing the tone frequencies by means of interrupters as described with reference to Figs. 1 and 2 they may be also produced by means of an alternating current generator of corresponding low frequency equal to the pitch of a musical tone, which currents may be superimposed on the windings 4 of the auxiliary magnetizing circuit. This modification is shown in Fig. 3 where 12 represents the low frequency auxiliary generator which supplies the coils $4^a$—$4^a$ wound on the transformer cores, for instance upon coils 4—4. The increases and decreases of the intensity of the alternating current affect the intensity of the field produced by the auxiliary direct current and thus produce the desired impulses in the secondary coils of the transformer. The increases and decreases of the effect of the direct current by means of the alternating current are also here to best advantage proportioned so that they produce the strong variations of the secondary current within the limits of the resonance curve. Also the direct current source may be entirely omitted and only an alternating current with tone frequency may be used as an auxiliary magnetizing current which in this case serves both purposes as well for the auxiliary magnetizing as also for imposing the low frequencies corresponding with the musical tone upon the field. This form is shown in Fig. 4, where 12 represents the auxiliary alternating current generator of musical tone frequency. The effect in this case is similar to the one described with reference to Fig. 2. During the positive or negative maximum of the amplitude of the auxiliary magnetizing alternating current the frequency in the transformer is raised, whereas at the intermediate values of the auxiliary current, no raise in frequency takes place. Also in this case of course the periodicity of the auxiliary current is far below that of the high frequency currents.

The strong effect which variations of the auxiliary magnetizing current have upon the intensity of the secondary current may also be used for imparting current variations produced by a microphone to the secondary circuit which contains the transmitter antennæ (not shown here). In this case the arrangement must be such that the resistance variations produced by the microphone affect the auxiliary magnetizing circuit so that in this manner correspondingly large variations of the current intensity are produced in the secondary coils of the transformer. This form is shown in Fig. 5, where the battery 8 and the auxiliary magnetizing coils 4 are shown in circuit with a microphone transmitter 13. In this figure like in Figs. 3 and 4 the primary and secondary coils of the transmitter have been omitted since they are arranged the same as shown in Fig. 1.

The peculiar relation between auxiliary magnetizing current and secondary current in such transformers as previously described, may also be used to great advantage for transmitting signals by means of the Morse key. For instance as shown in Fig. 6, the Morse key 14 may be arranged in shunt to the resistance 9, whereby the latter is dimensioned so that the current variations produced by the periodical short circuiting of the resistance produce the critical variations of the secondary current intensity within the limits of the resonance curve. It is of course obvious that for producing the tone frequencies and for producing signals by means of the Morse key the same resistance 9 can be used. This is illustrated in Fig. 1, where the switches 11 may have the form of Morse keys.

The arrangement of the high frequency transformer or rather the arrangement of the set of the two transformers in the circuit so far as the stepping up of the frequency is concerned may be made in any well known manner. For instance instead of only using one transformer set such as is shown for instance in Fig. 1 by which as is known, the primary frequency is doubled or tripled, also several sets of transformers may be used in cascade arrangement in order to further step up the frequency. In such cascade arrangement the secondary coils of the first set are connected with the primary coils of the secondary set as is shown for instance in Fig. 7 where two sets I, II are shown in cascade arrangement. If it is desired in this case to superimpose tone frequencies upon the high frequency current and in order to produce signals by means of the Morse key, arrangements of the character described and shown for instance in Fig. 1 are provided in the auxiliary magnetizing circuit of the last set (in this case set II).

While it is of course possible to step up the frequency from a low value to any desired high value, say for instance 40,000 or 60,000 periods by arranging as many transformer sets in cascade as are necessary, this seems to be in practice a very undesirable expedient for producing high frequency currents; in the first place on account of the great expense which a large number of sets involve, and in the second place, on account of the complications arising from the control and tuning of such large number of transformers. We therefore propose to supply alternating current to only a limited number of sets (say about 3 sets) of transformers of such high frequency as may be reasonably and economically produced in alternating current generators. Thus for instance a high frequency generator $6^a$, Fig.

7, of at least 5,000 periods per second, may be used in connection with one or several sets of high frequency transformers as shown in Fig. 7, to produce a high frequency current for practical purposes in wireless telegraphy. For instance with a periodicity of 5,000 supplied by the generator, a periodicity of 40,000 may be obtained with three sets of transformers and such arrangement is still very cheap compared with stepping up the frequency by means of stationary transformers alone and such arrangement has also still a very high technical efficiency. It is possible in such an arrangement to produce alternating currents of high frequency and a large energy at comparatively small primary energies and with comparatively little iron and copper which is evidently due to the fact that the frequencies of the primary energy used for supplying the transformer sets may be generated in a machine in which the necessary revolution number and the dimensions dependent thereupon have a favorable proportion to the amount of copper and iron used in the machine.

In the modifications heretofore described the auxiliary magnetizing current has been supplied to the transformer cores by a third winding 4. It is also possible, however, to supply the magnetizing current to either the primary or secondary winding of the two transformers. In this case where the source of direct current is directly electrically connected with either the primary or secondary coils of course a choking coil must be interposed in the direct current circuit. For example in Fig. 8 is shown how the magnetizing current supplied by battery 8 may be supplied to the primary coils 3. In this case a choking coil 16 is interposed in the auxiliary magnetizing circuit in which battery 8 is located and in this case coils 3 carry two kinds of current, and only one other set of coils, the secondary coils 5, are arranged on the transformer cores 1, 2.

In practice it has been found very difficult to use the high frequency current supplied by the secondary current of the last set (for instance in case of Fig. 7) with good efficiency directly at the point of consumption, because the latter (for instance in case of a sending antennæ) is genarlly represented by a resistance which often varies from that necessary to obtain the maximum efficiency of the high frequency current.

In order to produce the voltage necessary for the most efficient operation of the entire system it is of advantage to employ between the point of high frequency energy supply and the point of consumption a separate transformer of the ordinary kind which is merely used for stepping the voltage up or down as may be required. Such transformer is shown for instance in Fig. 9 at 17. The arrangement shown in this figure otherwise represents the typical arrangement illustrated in the figures previously described in so far as it contains an alternating current generator, primary coils, a source of current to produce the auxiliary magnetizing and secondary coils. The transformer 17 is placed in circuit with the secondary coils 5 which carry the high frequency current of the last step in case several steps are necessary. The terminals 18 of the transformer 17 are then connected to the high frequency energy consumer.

While we have shown in all previous figures the high frequency transformer consisting of two separate iron cores, each of which includes a distinctly separate magnetic circuit, it is of course possible to also join the two magnetic circuits in well known manner by employing an iron core which provides for two magnetic circuits. Such core is shown in Fig. 10 wherein 19$^a$ and 19$^b$ represent the two iron circuits corresponding with the two transformer rings 1 and 2 in the previous figures which, however, in this case are united and form a common path for both magnetic circuits at the portion 19. The transformer coils 3—3 and 5—5 are wound similarly to the manner in which they are wound and disposed in the previous figures, while winding 20, which is connected to the source of direct current 8, is wound on the common core 19. Coil 20 corresponds in this case with the coils 4—4 in the previous figures. Otherwise the arrangement is exactly the same as shown for instance in Fig. 1 so far as the interconnection of the coils is concerned.

We have shown in Fig. 10 this different arrangement to illustrate that principally two magnetic circuits are necessary to produce the desired result. It may thus be seen from the foregoing that these two magnetic circuits may be produced either by two independent closed iron paths or by two joined paths as shown in Fig. 10. Accordingly in the annexed claims the statement "a transformer having two magnetic circuits" is meant to comprise as well the two independent transformer cores as shown in Figs. 1 to 9, which thus form two magnetic circuits as also the two joined cores as shown in Fig. 10, and the term "transformer" is used in the claims to mean the entire device which is capable of stepping up the frequency.

What we claim is:

1. In an arrangement for producing high frequency current comprising a transformer, a primary and a secondary coil for each magnetic circuit, a source of auxiliary magnetizing current of suitable intensity adapted to simultaneously energize both magnetic circuits, a suitable source of alternating current connected to said primary coils, all of said coils being suitably disposed on the transformer to produce current in said secondary coils of higher frequency than that in the primary coil, and means for varying the intensity of said auxiliary current to correspondingly vary the intensity of the high frequency current generated in said secondary coils, the inductance capacity and resistance in the secondary circuit being suitably proportioned to produce large intensity variations in the secondary circuit at small intensity variations in the auxiliary circuit.

2. In an arrangement for producing high frequency current comprising a transformer having two magnetic circuits, a primary and a secondary coil for each magnetic circuit, a source of auxiliary magnetizing current of suitable intensity adapted to simultaneously energize both magnetic circuits, a suitable source of alternating current connected to said primary coils, all of said coils being suitably disposed on the transformer to produce current in said secondary coils of higher frequency than that in the primary coil, the inductance, capacity and resistance in said secondary circuit being suitably proportioned to syntonize said circuit to the higher frequency, and means for influencing the auxiliary magnetizing circuit to vary the syntony between the secondary circuit and the higher frequency.

3. In an arrangement for producing high frequency current comprising a transformer having two magnetic circuits, a primary and a secondary coil for each magnetic circuit, a source of auxiliary magnetizing current of suitable intensity adapted to simultaneously energize both magnetic circuits, a suitable source of alternating current connected to said primary coils, all of said coils being suitably disposed on the transformer to produce current in said secondary coils of a frequency higher than that in the primary coils, and signaling means suitably connected with said auxiliary current source for varying the intensity of the auxiliary field in accordance with the signals, to correspondingly vary the intensity of the high frequency current generated in said secondary coils.

4. In an arrangement for producing high frequency current comprising a transformer having two magnetic circuits, a primary and a secondary coil for each magnetic circuit, a source of auxiliary magnetizing current of suitable intensity adapted to simultaneously energize both magnetic circuits, a suitable source of alternating current, connected to said primary coils, all of said coils being suitably disposed on the transformer to produce current of higher frequency in said secondary coils than that in the primary coils, and means for imparting to the field generated by said auxiliary current impulses of a frequency equal to the pitch of a musical tone to produce impulses of corresponding frequency in the high frequency current generated in said secondary coils.

5. In an arrangement for producing high frequency current comprising a transformer having two magnetic circuits, a primary and a secondary coil for each magnetic circuit, a source of auxiliary magnetizing current of suitable intensity adapted to simultaneously energize both magnetic circuits, a suitable source of alternating current, connected to said primary coils, all of said coils being suitably disposed on the transformer to produce current of higher frequency in said secondary coils than that in the primary coils, and means for imparting to the field generated by said auxiliary current impulses of a frequency equal to the pitch of a musical tone to produce impulses of corresponding frequency in the high frequency current generated in said secondary coils, the inductance, capacity and resistance in the secondary circuit being suitably proportioned to produce large intensity variations in the secondary circuit at small intensity variations in the auxiliary circuit.

6. In an arrangement for producing high frequency current comprising a transformer having two magnetic circuits, a primary and a secondary coil for each magnetic circuit, a source of auxiliary direct current and auxiliary transformer windings connected in circuit therewith for simultaneously energizing both magnetic circuits, a suitable source of alternating current connected to said primary coils, all of said coils being disposed on the transformer to produce current of higher frequency in said secondary coils than that in the primary coils, and an auxiliary source of current of a frequency equal to the pitch of a tone and windings on said transformer connected with said auxiliary alternating current source for producing high frequency current variations of corresponding pitch in said secondary coils, the inductance, capacity and resistance in the secondary circuit being suitably proportioned to produce large intensity variations in the secondary circuit at small intensity variations in the auxiliary circuit.

GEORG von ARCO.
ALEXANDER MEISSNER.

Witnesses:
  HENRY HASPER,
  WOLDEMAR HAUPT.